United States Patent
Mouridsen et al.

(10) Patent No.: US 12,356,123 B2
(45) Date of Patent: Jul. 8, 2025

(54) REAL TIME SECURITY ALERT SYSTEM, METHOD AND COMPUTER PROGRAM

(71) Applicant: Contego AI Incorporated, Dover, DE (US)

(72) Inventors: Flemming Mouridsen, Worthing (GB); Christian Charalambous, Beckenham (GB)

(73) Assignee: Contego AI Incorporated, Dover, DE (US)

( * ) Notice: Subject to any disclaimer, the term of this patent is extended or adjusted under 35 U.S.C. 154(b) by 230 days.

(21) Appl. No.: 18/327,905

(22) Filed: Jun. 2, 2023

(65) Prior Publication Data
US 2024/0406353 A1   Dec. 5, 2024

(51) Int. Cl.
*H04N 7/18* (2006.01)
*G01S 13/88* (2006.01)
(Continued)

(52) U.S. Cl.
CPC ........... *H04N 7/188* (2013.01); *G01S 13/886* (2013.01); *G01S 13/887* (2013.01); *G01S 13/89* (2013.01); *G06N 5/022* (2013.01); *G06T 7/55* (2017.01); *G06T 11/00* (2013.01); *G06V 10/774* (2022.01); *G06V 20/52* (2022.01); *G06V 20/70* (2022.01); *G08B 13/19634* (2013.01); *H04N 23/61* (2023.01); *H04N 23/675* (2023.01);
(Continued)

(58) Field of Classification Search
CPC ...... H04N 7/188; H04N 23/61; H04N 23/675; G01S 13/886; G01S 13/887; G01S 13/89; G01S 13/867; G06N 5/022; G06T 7/55; G06T 11/00; G06T 2200/24; G06T 2207/10016; G06T 2207/10048; G06T 2207/20081; G06T 2207/30232; G06V 10/774; G06V 20/52; G06V 20/70; G06V 2201/05; G08B 13/19634
See application file for complete search history.

(56) References Cited

U.S. PATENT DOCUMENTS 8,437,556 B1 * 5/2013 Saisan .................. G06V 40/172
                                                                 382/199
9,922,512 B2 * 3/2018 Giri ....................... G08B 13/122
(Continued)

FOREIGN PATENT DOCUMENTS

CN             111539441 A       8/2020

*Primary Examiner* — Jared Walker
(74) *Attorney, Agent, or Firm* — Kevin J Fournier Intellectual Property Legal Services Ltd.; Kevin J Fournier

(57) ABSTRACT

A method of detecting security incidents and generating alerts receives an input from an mmWave sensor device, such input associated with potential security incidents, such input indicating a region of interest where an object of interest is present; processes the received input using an artificial intelligence (AI) engine and generates predicted labels describing the object of interest and the potential security incidents; activates in response to a content of a generated predicted label, a video camera, processes the output from the video camera using the AI engine to generate predicted labels describing the object of interest and the potential security incidents; and provides alerts to at least one of a plurality of output devices, where a value of a predicted label indicates a detection of a particular object of interest or a particular security incident.

16 Claims, 5 Drawing Sheets

(51) Int. Cl.

| | |
|---|---|
| *G01S 13/89* | (2006.01) |
| *G06N 5/022* | (2023.01) |
| *G06T 7/55* | (2017.01) |
| *G06T 11/00* | (2006.01) |
| *G06V 10/774* | (2022.01) |
| *G06V 20/52* | (2022.01) |
| *G06V 20/70* | (2022.01) |
| *G08B 13/196* | (2006.01) |
| *H04N 23/61* | (2023.01) |
| *H04N 23/67* | (2023.01) |

(52) U.S. Cl.
CPC .............. *G06T 2200/24* (2013.01); *G06T 2207/10016* (2013.01); *G06T 2207/10048* (2013.01); *G06T 2207/20081* (2013.01); *G06T 2207/30232* (2013.01); *G06V 2201/05* (2022.01)

(56) References Cited

U.S. PATENT DOCUMENTS

| | | | |
|---|---|---|---|
| 11,231,498 B1* | 1/2022 | Valdes Garcia | G06T 7/13 |
| 12,249,149 B1* | 3/2025 | Allan | G06V 20/49 |
| 2015/0030256 A1* | 1/2015 | Brady | G01S 17/89 |
| | | | 382/254 |
| 2015/0379356 A1* | 12/2015 | Nikolova | G01S 7/024 |
| | | | 342/90 |
| 2016/0092725 A1* | 3/2016 | Albertson | G06V 20/52 |
| | | | 340/407.1 |
| 2021/0396861 A1* | 12/2021 | Wellig | G06V 20/13 |
| 2022/0026561 A1* | 1/2022 | Valdes Garcia | G06V 10/803 |
| 2022/0334243 A1* | 10/2022 | DeAngelus | G06V 10/454 |
| 2022/0373673 A1* | 11/2022 | Sur | G06V 10/774 |
| 2023/0188682 A1* | 6/2023 | Tang | G06V 40/20 |
| | | | 348/152 |
| 2023/0334966 A1* | 10/2023 | Ullah | G06V 20/52 |
| 2023/0368537 A1* | 11/2023 | Bhattacharjee | H04N 23/61 |

* cited by examiner

REAL TIME SECURITY ALERT SYSTEM, METHOD AND COMPUTER PROGRAM

FIELD OF THE DISCLOSURE

The present disclosure relates to the technical field of detecting security incidents and providing real time security alerts in response to such detecting.

BACKGROUND

Detecting security incidents, such as detecting a concealed weapon being carried by a person who is entering a predetermined location, has been very difficult to carry out in a highly accurate and real time manner.

For example, it is possible to use mmWave detectors to detect an object being carried near a location adjacent to the location of the mmWave detector. Traditional mmWave imaging systems operate under the Synthetic Aperture Radar (SAR) principle. They use bulky, mechanical motion controllers or rigid bodies that move the mmWave device in a predetermined trajectory forming an aperture. As it moves along the aperture, the device transmits a wireless signal and measures the reflections bounced off of the nearby objects. Combining all the reflected signals coherently across the trajectory allows the system to discriminate the objects with higher reflectivity against the background noise. The spatial resolution of the final 2D or 3D shape depends on the span of the apertures in horizontal and vertical axes and the bandwidth of the system.

Public safety concerns have led to increased interest in methods and systems for detecting concealed weapons on individuals in various settings, such as airports, stadiums, schools, and other public venues, as well as in outdoor areas such as parks or forests. Traditional methods and devices for concealed weapons detection often rely on bulky equipment, require constant power sources, and may not be easily transportable or covert in design.

Moreover, many existing devices rely on multiple sensors working simultaneously, which increases power consumption and can lead to inefficiencies.

SUMMARY

The present disclosure describes a method of detecting security incidents and generating alerts, comprising the steps of:
(a) receiving an input from at least one mmWave sensor device, such input associated with potential security incidents, such input indicating a region of interest where an object of interest is present, such region of interest being associated with a vicinity in which the mmWave sensor device is located, wherein the mmWave sensor device detects a deviation from a baseline reading and indicates the region of interest in which the object of interest is present, in response to detection of such deviation;
(b) processing the received input using an artificial intelligence (AI) engine and generating predicted labels describing the object of interest and the potential security incidents;
(c) activating, in response to a content of a generated predicted label, at least one video camera or infrared sensor device, associated with the indicated region of interest, to provide an output from the at least one video camera or infrared sensor device;
(d) processing the output from the at least one video camera or infrared sensor device using the AI engine to generate predicted labels describing the object of interest and the potential security incidents; and
(e) providing alerts to at least one of a plurality of output devices, where a value of a predicted label from either step (b) or step (d) indicates a detection of a particular object of interest or a particular security incident.

The present disclosure also describes a computing system for detecting security incidents and generating alerts, comprising a processor and one or more memory devices communicatively coupled with the processor and storing instructions for, when executed on the processor, causing the computer system to carry out the steps of:
(a) receiving an input from at least one mmWave sensor device, such input associated with potential security incidents, such input indicating a region of interest where an object of interest is present, such region of interest being associated with a vicinity in which the mmWave sensor device is located, wherein the mmWave sensor device detects a deviation from a baseline reading and indicates the region of interest in which the object of interest is present, in response to detection of such deviation;
(b) processing the received input using an artificial intelligence (AI) engine and generating predicted labels describing the object of interest and the potential security incidents;
(c) activating, in response to a content of a generated predicted label, at least one video camera or infrared sensor device, associated with the indicated region of interest, to provide an output from the at least one video camera or infrared sensor device;
(d) processing the output from the at least one video camera or infrared sensor device using the AI engine to generate predicted labels describing the object of interest and the potential security incidents; and
(e) providing alerts to at least one of a plurality of output devices, where a value of a predicted label from either step (b) or step (d) indicates a detection of a particular object of interest or a particular security incident.

The present disclosure also describes a non-transitory computer readable device having instructions stored thereon that when executed by at least one computing device, causing the at least one computing device to perform operations comprising:
(a) receiving an input from at least one mmWave sensor device, such input associated with potential security incidents, such input indicating a region of interest where an object of interest is present, such region of interest being associated with a vicinity in which the mmWave sensor device is located, wherein the mmWave sensor device detects a deviation from a baseline reading and indicates the region of interest in which the object of interest is present, in response to detection of such deviation;
(b) processing the received input using an artificial intelligence (AI) engine and generating predicted labels describing the object of interest and the potential security incidents;
(c) activating, in response to a content of a generated predicted label, at least one video camera or infrared sensor device, associated with the indicated region of interest, to provide an output from the at least one video camera or infrared sensor device;
(d) processing the output from the at least one video camera or infrared sensor device using the AI engine to generate predicted labels describing the object of interest and the potential security incidents; and (e) providing alerts to at least one of a plurality of output devices, where a value of a predicted label from either step (b) or step (d) indicates a detection of a particular object of interest or a particular security incident.

Accordingly, the real time security alert system and method disclosed herein addresses these limitations, in example implementations but not all possible implementations, by emphasizing low-power consumption, mobility, covert design, AI-based object analysis, and integrated communication systems for threat warnings.

The disclosed method includes obtaining a millimeter wave (mmWave) sensor image associated with scanning a vicinity and identifying a region of interest within the vicinity where a person is present, primarily using the mmWave sensor image. Upon detecting an object of interest in the region of interest using an AI engine, at least one additional sensor is activated, such as an infrared (IR) camera, a visible domain camera, or other sensors suitable for concealed weapons detection.

By using the relatively low power mmWave sensor as a first level of detection and then only activating the relatively higher power video camera or infrared sensor at a second level of detection, once an object of interest has been identified at the first level of detection, a great savings in power is achieved.

Further, by using the trained Artificial Intelligence engine, in conjunction with other modules of the system, to recognize input data, from both an mmWave sensor and from a video camera, as a particular detection event, a highly accurate early warning system can be realized which can generate specific alerts to any immediate threat.

Specifically, because inputs are received from both an mmWave sensor and from a video camera, an accuracy of detection of incidents is greatly improved, since false positives can be identified, such as where a video camera input may indicate the presence of a detected event but the mmWave sensor does not.

The present disclosure, in exemplary implementations, provides a low-power concealed weapons detection device and method for detecting concealed objects on individuals using a combination of sensors, artificial intelligence analysis, and integrated communication systems. Exemplary implementations emphasize low-power consumption, mobility, covert design, AI-based object analysis, and communication systems for threat warnings.

Data from the mmWave sensor and the additional sensor (s) are gathered and analyzed using an AI engine to determine the type of object detected. The detected object is distinguished as a threat or non-threat based on the analysis, and a warning message is transmitted when the detected object is identified as a threat using a communication system operable over traditional internet, cellular internet, or low-power networks such as LoRaWAN.

The low-power concealed weapons detection device, according to some example implementations, can include a movable unit housing the device, an mmWave sensor for detecting objects of interest, at least one additional sensor (such as a video camera), a power management system for activating the additional sensor(s) only when an object of interest is detected by the mmWave sensor, an AI engine for analyzing the data gathered from the sensors and determining the type of object detected, and a communication system for transmitting a warning message when a detected object is identified as a threat. The device is, in some implementations, designed to maintain a covert appearance and to be easily moved to various locations for deployment.

DETAILED DESCRIPTION OF EXEMPLARY EMBODIMENTS

The components of the system of an exemplary implementation of a system will first be described with reference to FIG. 1, and then, the operation of the exemplary system in terms of method steps, will be described with reference to FIG. 2.

Figure 1:
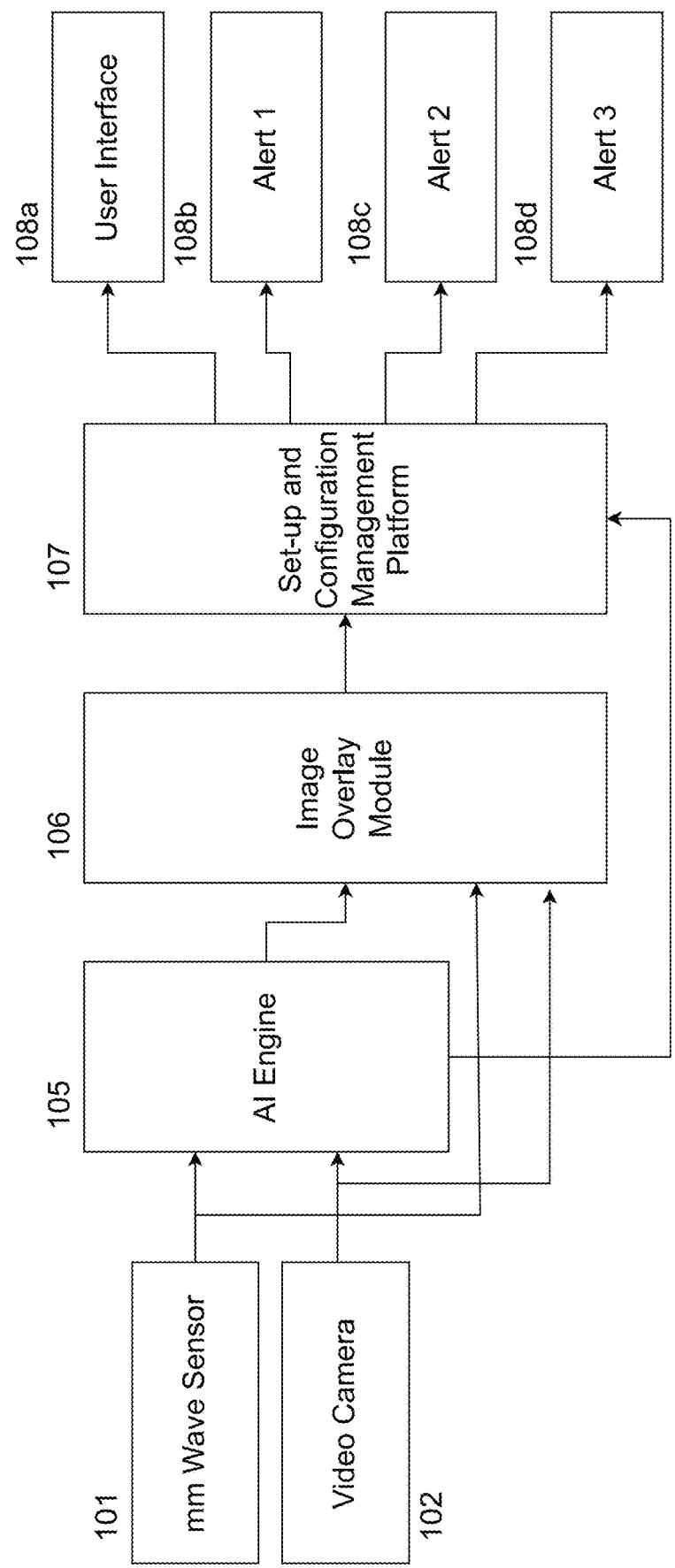
FIG. 1 is a block diagram of the system components making up an exemplary embodiment of the technology described in the present disclosure.

As shown in FIG. 1, a mmWave sensor device 101 is shown, providing an output signal to an Artificial Intelligence (AI) engine 105. In a typical example, there could be a plurality of such mm Wave sensor devices 101, and each one could be a mobile device carried by a security guard, perhaps worn on a security guard's vest. The security guards could be making their rounds, walking around a particular building or facility, such as a school, a shopping mall, factory, corporate setting, public transport, government building or any such facility.

The mmWave sensor device 101 could also be a stationary sensor. In a typical example, there could be a plurality of such stationary mmWave sensor devices 101, and each one could be located prior to any access point, or at any respective access point of the facility, such as an entrance door, or at a security screening station or outside of a restroom or anywhere else in the building.

An example of a typical mmWave sensor device, which could be used as the mmWave sensor 101 is the TI IWR1843, manufactured and sold by Texas Instruments, which is an integrated single-chip mmWave sensor based on FMCW (frequency modulated continuous wave) radar technology capable of operating in the 76- to 81-GHz band with up to 4-GHz continuous chirp. The device is built with the low-power 45-nm RFCMOS process from Texas Instruments. This solution enables unprecedented levels of integration in an extremely small form factor. While any mmWave sensor can be used, the IWR1843 is an ideal solution for low-power, self-monitored, ultra-accurate radar systems in industrial applications, such as, building automation, factory automation, drones, material handling, traffic monitoring, and surveillance. The mmWave sensors are deployed as stationary units in known funnel points such as entrance ways before and after security checkpoints, such as walkways or entrances to bathrooms, as well as mobile mmWave sensors which are deployed with ground personnel and are used to dynamically screen for potential weapons as the security guard makes the rounds. The system can be deployed in various configurations and other possible implementations include utilizing stationary mmWave sensors or mobile mmWave sensors as standalone solutions, or a combination of stationary and mobile mmWave sensors. For example, some implementations may use only one stationary mmWave sensor, while others may use two or more stationary sensors, while other implementations may use only one mobile mmWave sensor, or two mobile mmWave sensor, or a combination of several mobile and stationary mm Wave sensors.

MmWave systems enable through-obstruction imaging and are widely used for screening in state-of-the-art airports and security portals. They can detect hidden contrabands, such as weapons, explosives, and liquids, by penetrating wireless mmWave signals through clothes, bags, and non-metallic obstructions. In addition, mmWave imaging systems could enable applications to track beyond line-of-sight, see through walls, recognize humans through obstructions, and analyze materials without contaminating them. MmWave systems also have advantages over other screening modalities, such as privacy preservation and low-light condition usages over optical cameras; very weak ionization effect over x-ray systems; and shape detection of non-metallic objects over metal detectors.

Furthermore, the ubiquity of mm Wave technology in 5G-and-beyond devices enables opportunities for bringing imaging and screening functionalities to handheld settings. Hidden shape perception by humans or classification by machines under handheld settings will enable multiple applications, such as in situ security check without pat-down searches, baggage discrimination (i.e., without opening the baggage), packaged inventory item counting without intrusions, discovery of faults in water pipes or gas lines without tearing up walls, etc.

Returning to FIG. 1, the AI engine 105 also receives an input from a video camera 102, such as the IPC6622SR-X33-VF, or any other turret, bullet, dome, PTZ or fisheye camera. Another example could be an input from a mobile video camera such as a GoPro or the ESP32-CAM being worn by a security guard in the vicinity. In an example embodiment, the output of the video camera 102 could be fed to an image digitizer (not shown) which digitizes the analog output of the camera 102 and provides a digital output signal to the AI engine 105. In other examples, the video camera 102 directly produces a digital output signal and sends it directly to the AI engine 105, and therefore the image digitizer is not needed. The AI engine 105 could also receive an input from an infrared sensor instead of or in addition to the video camera 102.

One example implementation, therefore, combines stationary mmWave sensors with mobile mmWave sensors and visual camera information to an AI engine, for further processing to provide an early warning system. The video camera 102 could be stationary or mobile, and any number of such video cameras can be used, in combination with any number of mmWave sensors (mobile or stationary) depending on the specific requirements of the desired implementation system.

The AI engine 105, in one example implementation, is trained through machine learning techniques to identify potential weapons and firearms (or any other target object, such as detecting any metallic object, or detecting specific metal compositions) concealed on an individual or in an enclosure such as a bag or suitcase and to provide a detection output which results in a display of that information in a visual format in real time.

The AI engine 105 is a pretrained AI image detection and comparator engine, employing, for example, machine learning algorithms, which leverage the mmWave information to eliminate false positives such as the print of a gun on a t-shirt or a toy gun which may have been detected from the data from the video camera 102. For example, the video camera 102 may have detected an image of a gun on t-shirt of an individual walking past the video camera and accordingly, if the data from the video camera 102 alone were to be used, the AI engine 105 might detect that the target object (the gun) has been identified as entering the facility. However, in the example embodiment, this data from the video camera is combined with data from the mmWave sensor 101, so that this false positive can be correctly identified as merely an image of the target object on a t-shirt and not the target object (e.g., the gun) itself.

The AI engine 105 is trained, in advance of being used in an actual security detection environment, by providing the AI engine 105 with a large training set of data, from each of the units 101, 102 and from live data feeds of known objects, as well as from infra-red sensors, in order to expedite the learning process, and/or from a stored data set, together with, for example, labels identifying instances of the training set of data with particular target objects (e.g., particular weapons). For example, a particular instance of training data which corresponds to an image from a video camera 102 of a particular gun and also corresponds to a detection result from both a mobile mmWave sensor and the stationary mm Wave sensor for the same gun, would be given a label corresponding to the particular gun that has been identified. As another example, a particular instance of training data could correspond to other radar systems such as infrared and/or visual domain cameras and other security sensors of a particular nature with a particular and known dataset and also could correspond to a detection result from both a mobile mmWave sensor and the stationary mmWave sensor for the same gun, and would be given a label corresponding to the particular gun that has been identified.

This training data instance would be fed into the AI engine 105 during the training phase, together with the label corresponding to the particular gun. In this way, the AI engine 105 is trained to recognize that when newly received data that is close in content/values to this data set instance is input again after the training phase is completed, the AI engine 105 can recognize, from its prior learning/training, that this newly received data should be matched to the same label that was input during the training phase. The training is carried out, for example, by using a loss function and attempting to minimize the loss function as is well known in AI training scenarios.

The AI engine 105 can be trained/configured to act upon the inputs from the units 101, 102 in various ways (multiple configurations) depending on the needs of any particular security detection environment. For example, the video camera 102's input showing an image of a particular weapon may not be considered as dispositive of the weapon having been identified until a confirmation is received from the output of one of the mmWave sensors, and only upon such confirmation is a positive detection identified by the AI engine 105, whereas if one of the mmWave sensors detects a potentially concealed weapon, a positive detection will be immediately identified by the AI engine 105 and sent out to the downstream units (to be described below). As another example, a mmWave sensor must send a positive detection multiple times, or need independent confirmation from another standalone mmWave sensor before the system determines that a concealed weapon has been identified, and only upon such confirmation is a positive detection identified by the AI engine 105. This enables the system to deal with the false positive situation described above, allowing more accurate distinction between various types of objects, whether they are real weapons or merely images or replicas, or fine-tuning the system's sensitivity and decision-making process by optimizing the fusion of sensor data and setting appropriate thresholds, thereby more effectively mitigating the occurrence of false positive situations and enhancing overall detection performance. For example, the system can avoid labelling an input as a positive detection when in fact the video camera 102 has only identified an image of a gun on a t-shirt, for example (or other mmWave sensors are not providing positive signals, suggesting that the sensor may be faulty).

The AI engine 105 can be configured to classify detected objects into distinct categories, including, but not limited to, 'threatening object,' 'non-threatening object,' and 'undetermined object.'

There are many different types of MLAs (Machine Learning Algorithms) known in the art. Broadly speaking, there are three types of MLAs: supervised learning-based MLAs, unsupervised learning-based MLAs, and reinforcement learning based MLAs.

Supervised learning MLA process is based on a target-outcome variable (or dependent variable), which is to be predicted from a given set of predictors (independent variables). Using these set of variables, the MLA (during training) generates a function that maps inputs to desired outputs. The training process continues until the MLA achieves a desired level of accuracy on the validation data. Examples of supervised learning-based MLAs include: Regression, Decision Tree, Random Forest, Logistic Regression, etc.

Unsupervised learning MLA does not involve predicting a target or outcome variable per se. Such MLAs are used for clustering a population of values into different groups, which is widely used for segmenting customers into different groups for specific intervention. Examples of unsupervised learning MLAs include: Apriori algorithm, K-means.

Reinforcement learning MLA is trained to make specific decisions. During training, the MLA is exposed to a training environment where it trains itself continually using trial and error. The MLA learns from past experience and attempts to capture the best possible knowledge to make accurate decisions. An example of reinforcement learning MLA is a Markov Decision Process.

It should be understood that different types of MLAs having different structures or topologies may be used for various tasks. One particular type of MLAs includes artificial neural networks (ANN), also known as neural networks (NN).

Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus, rather than attempting to determine a complex statistical arrangements or mathematical algorithms for a given situation, the given NN aims to provide an "intuitive" answer based on a "feeling" for a situation. The given NN is thus regarded as a trained "black box", which can be used to determine a reasonable answer to a given set of inputs in a situation when what happens in the "box" is unimportant.

NNs are commonly used in many such situations where it is only important to know an output based on a given input, but exactly how that output is derived is of lesser importance or is unimportant. For example, NNs are commonly used to optimize the distribution of web-traffic between servers and in data processing, including filtering, clustering, signal separation, compression, vector generation and the like.

In some non-limiting embodiments of the present technology, the NN can be implemented as a deep neural network. It should be understood that NNs can be classified into various classes of NNs and one of these classes comprises recurrent neural networks (RNNs).

RNNs are adapted to use their "internal states" (stored memory) to process sequences of inputs. This makes RNNs well-suited for tasks such as unsegmented handwriting recognition and speech recognition, for example. These internal states of the RNNs can be controlled and are referred to as "gated" states or "gated" memories.

It should also be noted that RNNs themselves can also be classified into various sub-classes of RNNs. For example, RNNs comprise Long Short-Term Memory (LSTM) networks, Gated Recurrent Units (GRUs), Bidirectional RNNs (BRNNs), and the like.

LSTM networks are deep learning systems that can learn tasks that require, in a sense, "memories" of events that happened during very short and discrete time steps earlier. Topologies of LSTM networks can vary based on specific tasks that they "learn" to perform. For example, LSTM networks may learn to perform tasks where relatively long delays occur between events or where events occur together at low and at high frequencies. RNNs having particular gated mechanisms are referred to as GRUs. Unlike LSTM networks, GRUs lack "output gates" and, therefore, have fewer parameters than LSTM networks. BRNNs may have "hidden layers" of neurons that are connected in opposite directions which may allow using information from past as well as future states.

Another example of the NN that can be used to implement non-limiting embodiments of the present technology is a residual neural network (ResNet).

Deep networks naturally integrate low/mid/high-level features and classifiers in an end-to-end multilayer fashion, and the "levels" of features can be enriched by the number of stacked layers (depth).

To summarize, the implementation of at least a portion of the one or more MLAs in the context of the present technology can be broadly categorized into two phases-a training phase and an in-use phase. First, the given MLA is trained in the training phase using one or more appropriate training data sets. Then, once the given MLA learned what data to expect as inputs and what data to provide as outputs, the given MLA is run using in-use data in the in-use phase.

Returning to FIG. 1, if neither unit 101, 102 provides an input which results in the AI engine 105 detecting anything of interest, a negative message will be output from the AI engine 105 and the system will cycle through this phase until a positive message is output from the AI engine 105.

In the event of a positive message being output from the AI engine 105 (e.g., a label is output from the AI engine 105 identifying a particular type of weapon from the inputs 101, 102), a positive detection message is sent from the AI engine 105 to a set-up and configuration management platform 107 which analyses the label, applies programmable logic to the label, and sends a control message to an appropriate output unit 108*a* through 108*d*, in order to alert the appropriate authorities of the potential emergency situation.

In the event of a positive message being output from the AI engine 105, this positive detection message is, in some implementations, also sent from the AI engine 105 to an image overlay module 106 which also receives radar data from the mmWave sensor 101 and camera image data from the video camera 102 and superimposes the radar data onto the camera image data to generate an overlay image for purposes of operator notification. For example, an operator in a control room will receive an alert and an image or live video feed (from the video camera 102) of the suspect will be displayed (for example, on user interface 108*a*) with the mmWave data superimposed (overlaid) onto the image/live video feed to give the operator an indication as to where on the person the suspected weapon is located, i.e., in a backpack, tucked in the belt or strapped to their leg, etc.

This superposition of the mmWave data onto the video data enables an operator to monitor the output from the system, interpret the results, and take appropriate action. It presents the information in a user-friendly manner.

Figure 4:
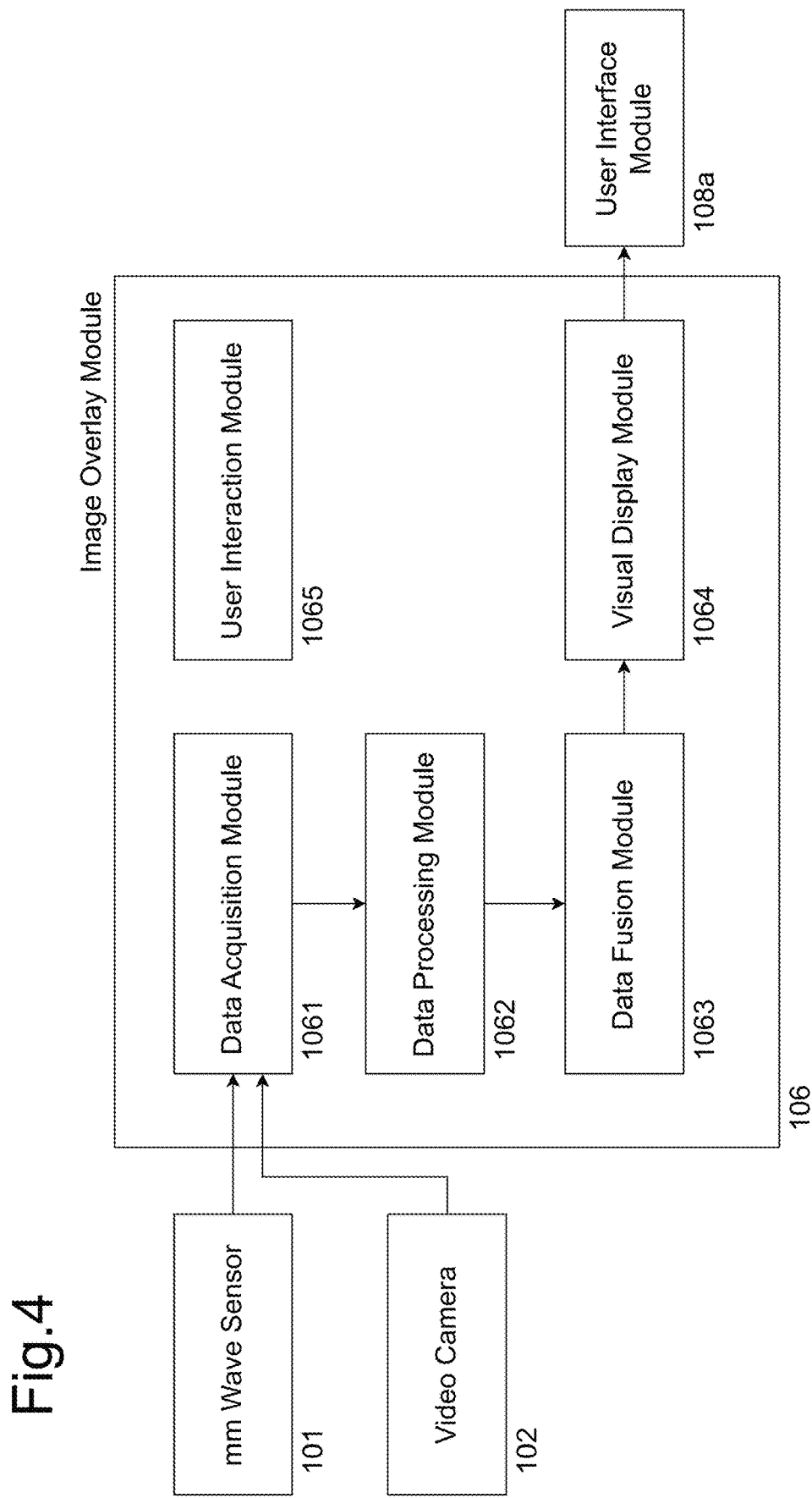
FIG. 4 is a block diagram showing the software modules of the image overlay module of FIG. 1, according to an exemplary implementation.

The image overlay module 106 has the following modules, according to an exemplary implementation as shown in FIG. 4.

Data Acquisition Module 1061: this module receives data from the mmWave sensor 101 and the video camera 102 in real-time or near-real-time. These sensors can capture images and relevant information about the detected objects, including their size, shape, and location.

Data Processing Module 1062: This module processes the raw data from the sensors 101/102 and performs preliminary analysis, which may include noise reduction, image enhancement, and normalization to ensure accurate and reliable results.

Data Fusion Module 1063: This module combines the data from the sensors 101/102 to create a comprehensive view of the scanned area. This process is known as data fusion. Data fusion may include techniques such as edge filtering, depth information extraction, or other suitable methods for aligning the images from different sensors.

Figure 5:
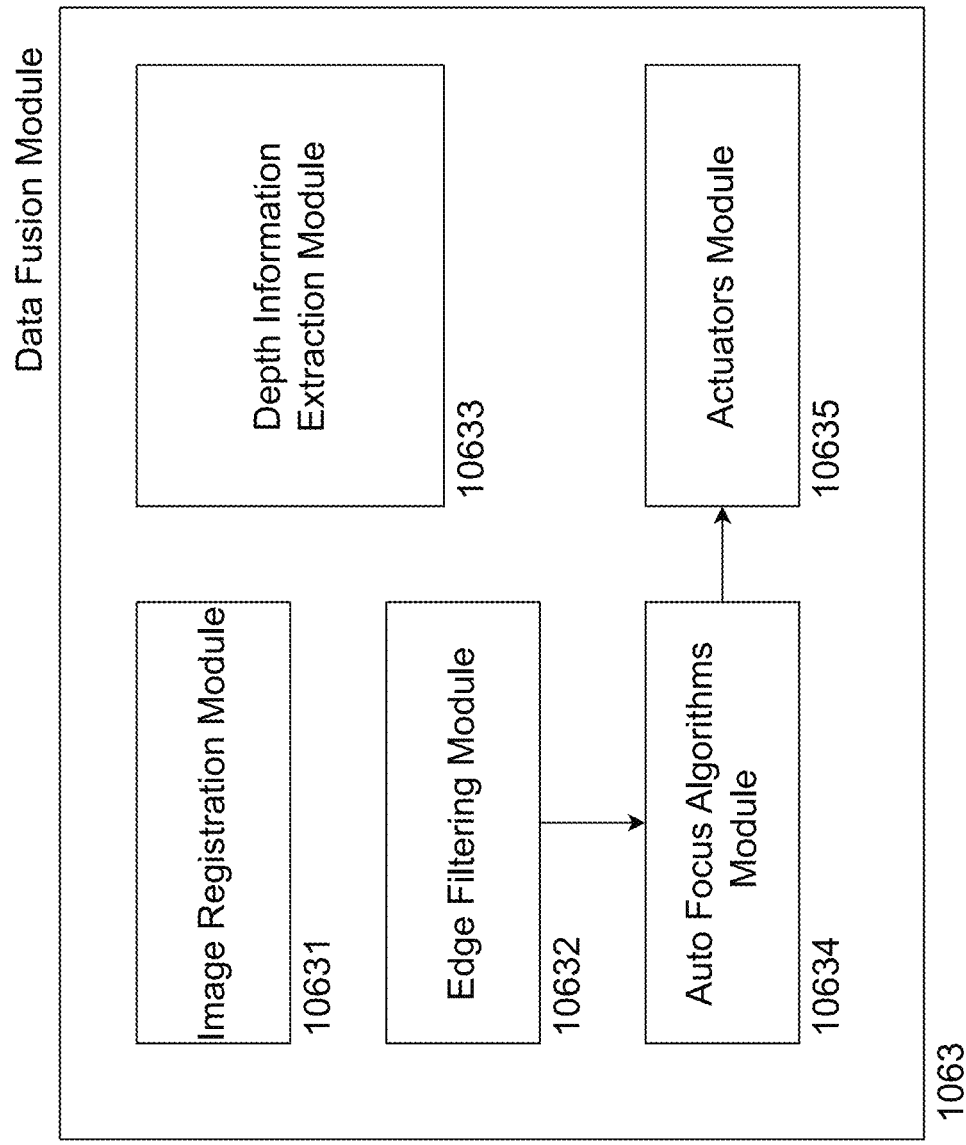
FIG. 5 is a block diagram showing the software modules of the Data Fusion Module of FIG. 4, according to an exemplary implementation.

The Data Fusion Module 1063 includes an alignment mechanism which is responsible for accurately synchronizing and aligning the images obtained from the mmWave sensor and video camera(s) to ensure a seamless integration of the data. The Data Fusion Module 1063, in an exemplary implementation, includes an example of the alignment mechanism, having modules which are shown in FIG. 5.

Image Registration Module 10631: This module utilizes image registration techniques to align the images from the mmWave sensor and video camera(s). This involves identifying common features or keypoints in both images and then using these features to estimate the transformation required to align the images. Techniques such as Scale-Invariant Feature Transform (SIFT), Speeded Up Robust Features (SURF), or Oriented FAST and Rotated BRIEF (ORB) can be used for this purpose.

Edge Filtering Module 10632: This module can employ edge filtering techniques to emphasize the boundaries or contours of objects in both the mmWave sensor and video camera images. By comparing and matching the edge information in both images, the alignment mechanism can estimate the transformation needed to align the images accurately. Edge detection algorithms like Sobel, Canny, or Laplacian of Gaussian (LoG) can be utilized to extract edge information.

Depth Information Extraction Module 10633: This module, which is also part of the alignment mechanism, can use depth information to improve the alignment process. Depth information can be obtained from the mmWave sensor image, or it can be determined using additional sensors (such as LIDAR) or other techniques (e.g., stereo vision or structured light). By incorporating depth information, the alignment mechanism can better account for the differences in perspective and scale between the mmWave sensor and video camera images, leading to a more accurate alignment.

Depth information can be obtained from the mmWave sensor image or determined using one or more background objects, referring to objects that are present in the scene but are not the primary subjects of interest for the concealed weapons detection, for example. These objects can be anything, such as walls, furniture, or other people, that are not directly related to the concealed weapon detection process.

Using background objects for depth information extraction can help in aligning the images from the mmWave sensor and the video camera(s). By identifying and analyzing the relative positions and dimensions of these background objects in both the mmWave sensor image and the video camera image, the system can estimate the depth information and spatial relationships between different objects in the scene. This information can then be used to improve the alignment and synchronization of the images, as well as to adjust the focus of the mmWave sensor and the video camera on the region of interest, ultimately enhancing the accuracy of concealed weapon detection.

Additionally, the Data Fusion Module 1063 of FIG. 4 can include a focusing mechanism which can be included for adjusting the focus of the mmWave sensor 101 and the video camera 102 on the region of interest. The focusing mechanism 109 is a component designed to adjust the focus of the mmWave sensor 101 and the video camera 102, or other security system on the region of interest (ROI). The purpose of this mechanism is to ensure that the images captured by both the mmWave sensor and the video camera are sharp and provide sufficient detail for the concealed weapons detection process.

As further shown in FIG. 5, the focusing mechanism can include the following modules:

Autofocus Algorithms Module 10634: These algorithms can analyze the images captured by the video camera and the mmWave sensor to determine the optimal focus settings. For example, they can evaluate the sharpness or contrast of the images and adjust the focus accordingly to maximize these parameters.

Actuators Module 10635: The Actuators Module can be employed to control the position of the lenses in the video camera and the mmWave sensor. By adjusting the distance between the lenses and the image sensors, the focusing mechanism can change the focus settings to achieve optimal sharpness in the images.

The depth information from the Depth Information Extraction Module 10633 can be used by the focusing mechanism to set the appropriate focus distance for the mmWave sensor and the video camera, ensuring that the region of interest is in sharp focus.

The focusing mechanism can work in a feedback loop, constantly evaluating the captured images and adjusting the focus settings in real-time. This continuous adjustment can help maintain optimal focus even if the subject or the ROI (region of interest) is moving within the scene.

By incorporating these elements, the focusing mechanism ensures that the images captured by the mmWave sensor and the video camera are of high quality and contain sufficient detail for accurate concealed weapon detection.

Returning to FIG. 4, the image overlay module also includes a Visual Display Module 1064: This module presents the results on a display device 108a (e.g., a monitor or screen) for the operator to view. It overlays the potential concealed objects on the original images, highlighting them, for example, with distinct colors or symbols to indicate their AI classification (e.g., red for threatening objects, green for non-threatening objects, and yellow for undetermined objects).

The image overlay module 106 can also include a User Interaction Module 1065: This module may also be included, in some implementations, to provide an interactive interface for the operator to adjust settings, zoom in on specific regions of interest, and obtain more detailed information about the detected objects. This interface can help the operator make informed decisions about whether to take further action, such as alerting.

In one example implementation, the AI engine 105 can provide a positive detection signal to the set-up and configuration management platform 107, and the image overlay module 106 can provide the image overlay to the setup and configuration management platform 107. The set-up and configuration management platform 107 is programmed or configured to specify values of a plurality of variables used to control the management of the overall system. For example, one variable could specify the necessary number of mm Wave sensors necessary to trigger a confirmation and subsequently send out an alert of a concealed weapon. That is, in this example, the variable could specify that a positive confirmation of a determination that a concealed weapon has been detected requires that two mmWave sensors have provided an output that has led to the positive confirmation. The module 107 can also be programmed, as mentioned above, to provide an output signal to the appropriate output unit 108a to 108d, depending on the contents of the predicted label output from the AI engine 105.

Another variable, whose value has been specified during programming of the set-up and configuration management platform, could deal with the false positive situation mentioned above. Specifically, if the output of the video camera 102 indicates to the AI engine 105 that an image of a particular gun has been identified, a variable could be set in the platform 107 such that this output from the video camera 102 is not accepted as a positive confirmation of a security incident unless an output from a mmWave sensor 101 also indicates to the AI engine 105 that the particular gun has been identified. In this way, if the video camera 102 provides an image of the particular gun, but this image is simply portrayed on a t-shirt of an individual entering a particular facility, this incident will not be identified as a high risk security incident because of the lack of confirmation from a mmWave sensor 101, thus avoiding a false positive situation from being flagged up as an alert. An alternative scenario could be that the video camera 102 fails to detect an image of a particular weapon, such as where the weapon is concealed on an individual's person, such as in a bag or hidden under a person's clothing, but the mmWave sensor 101 detects the particular weapon and this scenario results in a positive detection of the weapon.

Still another variable, whose value has been specified during programming of the set-up and configuration management platform, could be the number of positive alerts from a single mmWave sensor to provide a confirmation of weapons detection. For example, a single detection could provide a "warning", whereas 3 positive detections could provide a "high risk alert". Another variable could be the types of alerts that are sent out, considering not every organization would like to have sirens blaring in the event of a positive detection and might prefer to have silent digital notifications in the form of, for example, an SMS text notification or an app notification.

In an alternative embodiment, rather than using the set-up and configuration management platform 107, the trained AI engine 105 could be trained to only provide a high-risk security incident label when the inputs from devices 101/102 have the corresponding values (such as positive or Yes values, and how many are needed). For example, the AI engine 105 can be trained to recognize the false positive situation mentioned above (or false positives through multiple readings and comparison to other mmWave sensor readings) and not output the label of high risk security incident when a video camera 102 outputs an image of a particular weapon but a mmWave sensor 101 input does not also identifies the particular weapon. In this case, the AI engine 105 can provide the predicted label directly to the appropriate output unit 108a-108d.

As shown in FIG. 1, in the illustrated example implementation, the output of the set-up and configuration management platform is provided to a plurality of output units 108a, 108b, 108c, 108d. 108a could be a user interface display which displays data such as an image of a person captured by the video camera 102 where the person is in the same image as a weapon which has also been identified, for example, by the mmWave sensor 101. The user interface 108a could also display, for example, the location of the potentially concealed weapon on the person of the individual (using, for example, the output from the image overlay module 106 as described above), or also the number of sensors which have taken into account in identifying the security incident as being high-risk. A confidence level, indicating the AI engine's confidence in its assignment of a particular label to a particular set of inputs, could also be determined and displayed on the user interface 108a.

Output units 108b, 108c and 108d could be alert units, which generate, for example, alarm siren signals, loud audio sounds, flashing lights, vibration signals, digital alerts or the like, to notify the appropriate authorities, such as the police, security guards, facility management, etc., of the detected high-risk security incident. The set-up and configuration management platform 107 can be programmed to provide appropriate outputs to the respective output units 108a-108d, depending on the particular requirements of the organization implementing the system.

Figure 2:
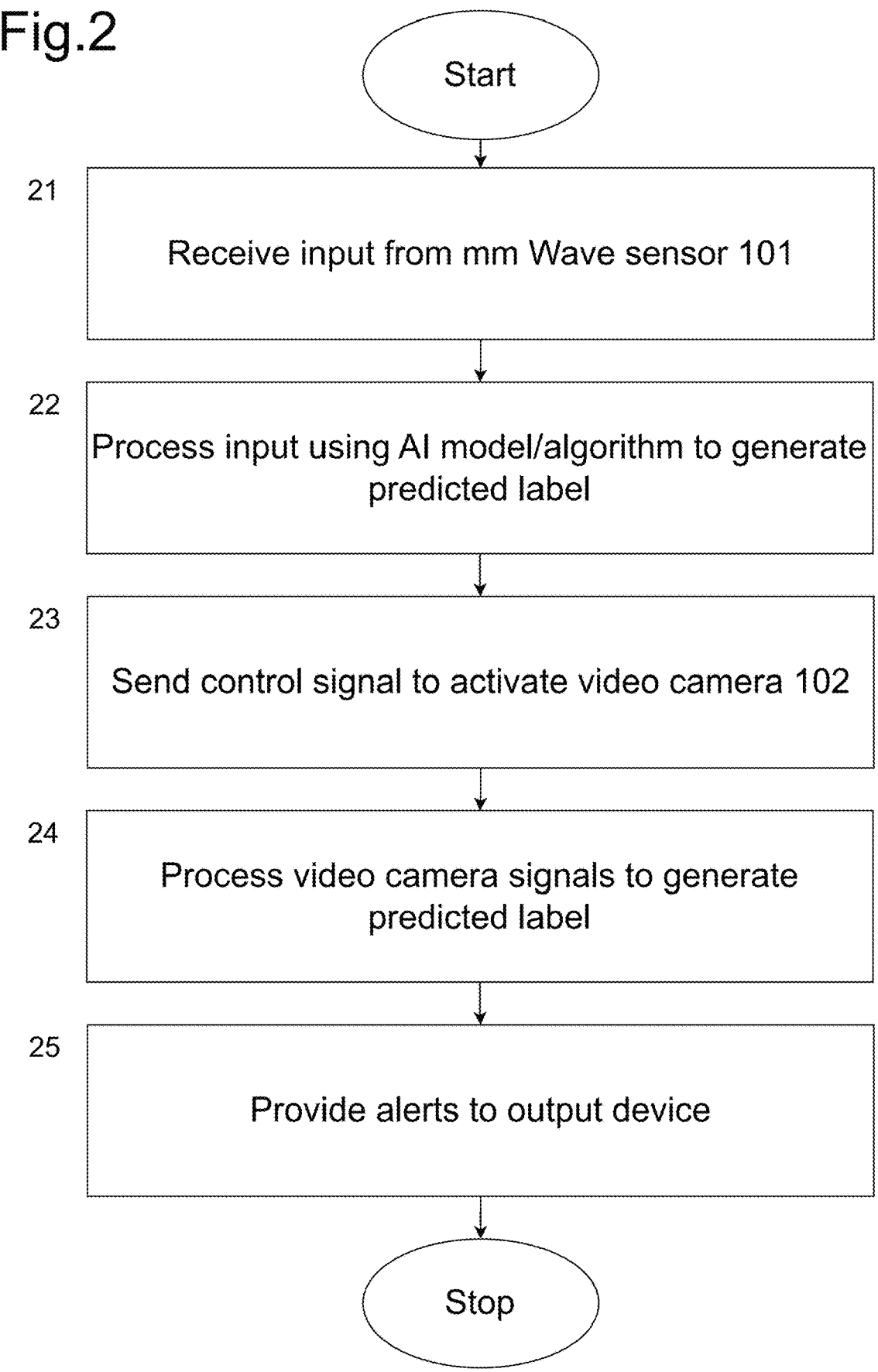
FIG. 2 is a flow chart showing functional steps which are carried out according to an exemplary embodiment of the technology described in the present disclosure.

Turning to the flowchart of FIG. 2, an exemplary embodiment of a method of detecting a security alert incident is shown, according to the teachings of the present disclosure.

At step 21, the AI engine 105 receives an input from the mmWave sensor 101. There could be several mmWave sensors providing such input, and these mmWave sensors could be stationary or mobile, as mentioned above. The input to the AI engine 105 provided by the mmWave sensor 101 is associated with potential security incidents, such input indicating a region of interest where an object of interest is present, such region of interest being associated with a vicinity in which the mmWave sensor device is located. Specifically, the mmWave sensor 101 detects a deviation from a baseline reading and indicates the region of interest in which the object of interest is present, in response to detection of such deviation.

The AI engine 105 next, at step 22, processes the input from the mmWave sensor 101 using an AI model/algorithm, which has been trained in advance, to identify aspects of the input and to classify the input and assign the result to a predicted label (or a plurality of predicted labels), according to well-known AI techniques and processes. The predicted labels describe security incidents including an object of interest that has been identified and classified by the AI engine 105 using the input the AI engine 105 has received from the mmWave sensor 101.

At step 23, the AI engine 105 then outputs a control signal, in response to a content of at least one generated predicted label, to activate at least one video camera device 102 (or infrared sensor device), associated with the indicated region of interest, At step 24, the video camera device 102, once it has been activated, provides an output from the video camera device 102 which is received at the AI engine 105, where the AI engine 105 processes the output from the video camera device 102, possibly combined with mmWave sensor information that the AI engine 105 is also receiving, to generate one or more predicted labels describing the object of interest and the potential security incidents. In this way, the further processing by the AI engine 105 using the input from the video camera device, once it has been activated, increases the certainty of determination of the object's nature. In this way, once the video camera device 102 is activated, the AI engine 105 can cross reference the video camera data with the mmWave data in order to eliminate as many false positives as possible and build as robust a picture as possible of the object of interest.

At step 25, alerts are provided to at least one of a plurality of output devices (108a, 108b, 108c and 108d), where a value of a predicted label provided at either step 22 or step 24 indicates a detection of a particular object of interest or a particular security incident.

In a further exemplary implementation, the predicted label output from the AI engine 105 (produced at either step 22 or step 25) is sent to the set-up and configuration management platform/module 107 for providing an alert output signal to the corresponding output unit(s) 108a to 108d. An appropriate alert can therefore be quickly and efficiently generated. The predicted label output from the AI engine 105 can also be sent, in parallel, to the image overlay module 106 which uses the predicted label, as well as inputs from the mmWave sensor 101 and video camera 102, to overlay data from the mmWave sensor(s) 101 onto the video feed from the video camera 102 for operator notification through live video or static image of the suspect with overlay from mmWave sensor 101 data superimposed as, for example, a red box in the region of detection on the person, such as in a backpack, or concealed beneath clothing on a particular region of the body.

In this further exemplary implementation, the set-up and configuration management platform 107 applies its input(s) to programmed logic having configured variables as described above, in order to subject the input to logical processing to generate output signals, as described above. The output(s) of the set-up and configuration management platform 107 is/are then provided to the output devices 108a-108d, to provide alerts to the appropriate authorities, to alert them of the security incidents that have been detected.

Figure 3:
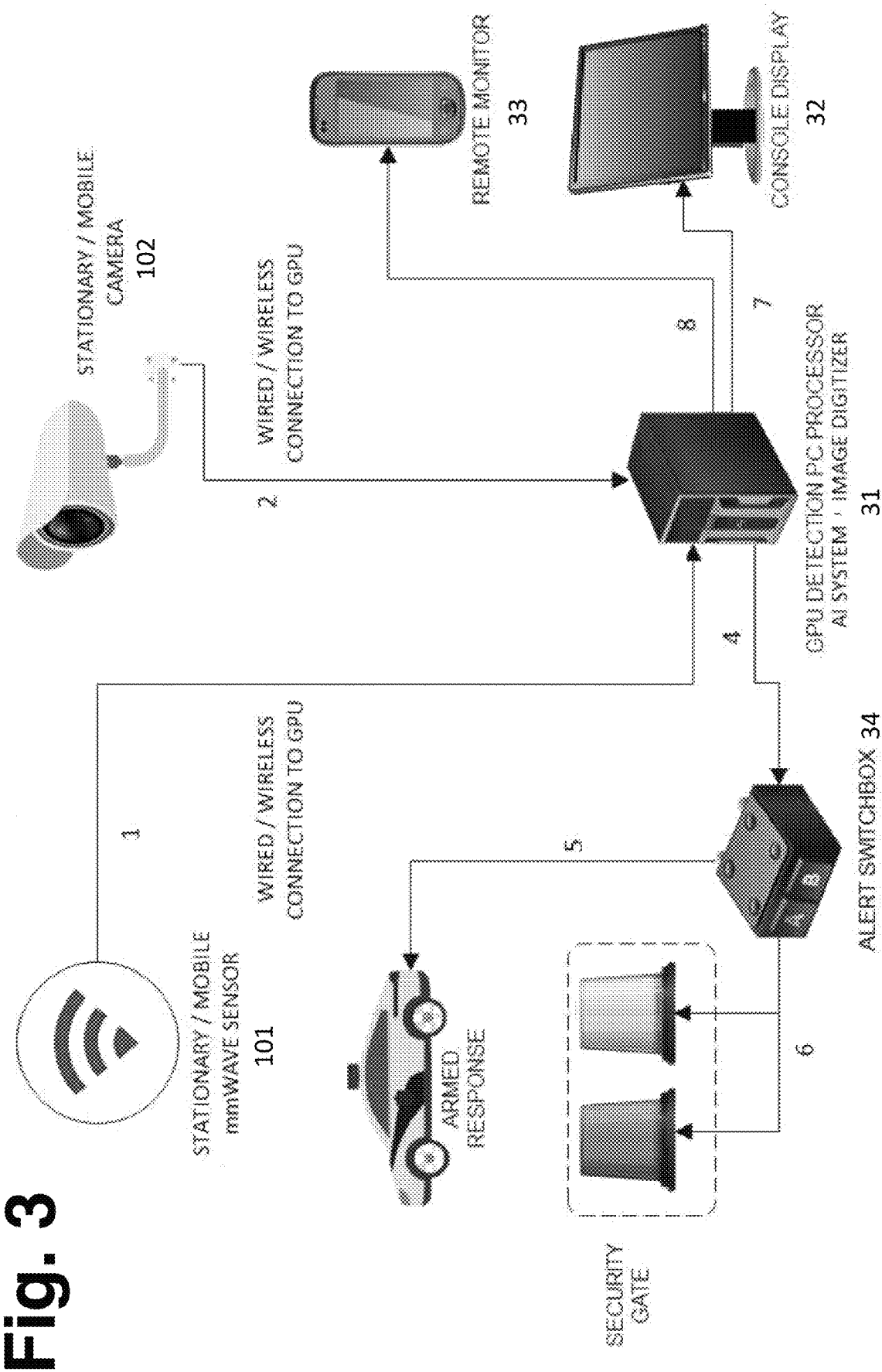
FIG. 3 is a block diagram showing hardware components making up an exemplary embodiment of the technology described in the present disclosure.

The hardware diagram of FIG. 3, showing an exemplary hardware configuration of the disclosed system, will now be described.

The mmWave radar unit/sensor 101 is shown in FIG. 3 to be connected, see connection line 1 in FIG. 3, for example, via a wired or wireless connection to a processor 31. The processor 31 could be a GPU Detection PC Processor, such as the Jetson Nano by Nvidia, or any other processor of sufficient compute power.

Raw video camera footage from video camera 102, which could be a 4K digital camera, is sent, for example, as an HDMI composite signal, along connection line 2 in FIG. 3, to the processor 31 (which may include an image processor software unit and which may be also called a GUI, Alert and Management processor).

The processor 31 takes the data from the mmWave sensor 101 and from the video camera 102 and uses AI processing to determine the predicted label and accordingly, the level of threat.

For example, if no mmWave sensor picks up a yes detection, the risk is minimal. If the mmWave sensor picks up a yes detection, the risk becomes moderate. If the mmWave sensor and the video camera pick up a yes detection, or if the mmWave sensor detects multiple yes signals and/or this can be confirmed by other independent stationary or mobile mmWave sensors, the risk becomes high. Low risk scenarios do not trigger any warnings or alarms. Moderate risk detections will send out messages to the console display 32 (e.g., an LCD display) and remote monitors e.g., 33 (i.e., the user interface 108a) (over connection lines 7 and 8 of FIG. 3). High risk detections will send out messages to the alert switchbox 34 and the console display 32 and remote monitor 33.

The detection risk level message is sent to the alert switchbox 34 which notifies the closest response units and command centers as to the level of threat and other information. At connection line 5 in FIG. 3, information is sent to nearest ground personnel, which could be armed response patrols (security or police personnel). At connection line 6 information is sent to local and other accessible security gates, command center or the like. Over connection line 7 information is sent to user command center/console display for security personnel to be quickly apprised of the incident. Over connection line 8 information is sent to remote monitors 33 used by security gates and ground personnel.

The communications associated with the alerts are operable over traditional internet, cellular internet, low-power networks such as LoRaWAN, or other radio, digital or analogue transmission to security stations, operations rooms, security guards, GUI's, mobile phones, etc.

The mmWave sensor(s) 101 can be powered by battery (such as, for example, a Lithium battery), grid power, solar power, wind power or any other power source suitable for the deployment area. The mmWave sensor accordingly consumes low power, as it requires much less power to operate as compared to, for example, a video camera 102. Accordingly, by using the mmWave sensor, at a first level of detection, as the first sensor, at step 21, to provide an input to the AI engine, and only activating the video camera 102 once the AI engine produces a label indicating a potential security concern, much power can be saved, as compared to an alternative potential configuration where the mmWave sensor 101 and the video camera 102 are both operable from the start. This selective activation is therefore part of a power management system of the present disclosure, which reduces power consumption significantly.

In some example implementations, the mmWave sensor 101 and video camera 102 are packaged together into a covert and compact unit, and therefore easily deployed and moved from one location to another.

In example implementations, advanced miniaturized components are used for the mmWave sensor, video camera, and other electronic components, such as microcontrollers, processors, and power supply units, which can reduce the overall size and footprint of the system.

In example implementations, the seamless integration of the mmWave sensor and video camera into a single module, streamlines the design and optimize space usage by sharing common components, such as power and signal processing units.

One example implementation incorporates energy-efficient components and intelligent power management techniques to minimize power consumption, thus allowing for smaller batteries or power supplies to be used without compromising performance.

An example implementation includes designing custom PCBs (printed circuit boards) with compact layouts, that fit the space of the covert concealment, reducing the number and size of connectors, and utilizing multi-layer designs to minimize the space occupied by the electronic components. An example implementation includes utilizing lightweight and compact materials for the housing and structural components, and designing the system with a focus on efficient utilization of space, allowing for a smaller overall form factor.

The processing functionality, including the AI engine 105, can either be included within this compact unit, or the compact unit including the sensors/cameras can communicate over any suitable network with the processing functionality which could be located, for example, in a computing cloud infrastructure. The low-power concealed weapons detection device, in an example implementation, is designed with a movable unit housing that enables easy transportation and deployment in various locations. In an example. Implementation, the covert appearance of the device allows it to blend seamlessly into its surroundings, reducing the likelihood of individuals being aware of the detection process.

One of the biggest challenges in this area of detecting potential concealed objects of interest is that many incidents occur right before security checkpoints. Security checkpoints essentially function as a large sign to any bad actor to initiate their actions prior to, or at the security checkpoint. The disclosed system, in sample implementations, is covertly designed and can be deployed with customized PCB's and packaged into a compact package, with the mmWave acting as a non-intrusive switch that alerts security operators, security stations, guards and other interested parties that an object of interest is approaching. The covert and compact nature of the device, makes it much more difficult for bad actors to assume where they potentially could be scanned and could be implemented in places such as bathroom entrances to detect any concealed objects of interest and alert and activate various other security systems and personnel in the building such as infrared or visual-domain cameras of the location of the detection and begin tracking the objects movements. Also, the fact that the device runs on low power means that the device can be placed in unpredictable places, where there are no wired power sources, such as alleyways leading to a school, and thus help to avoid being detected by bad actors carrying a dangerous object.

In some example implementations, the housing and structural components of the system are designed to be unobtrusive and blend in with the surrounding environment. This may include utilizing neutral colors and discrete shapes that do not attract attention. The system, in some example implementations, can employ energy-efficient components and power management techniques to reduce power consumption, resulting in less heat generation and making it less noticeable to thermal imaging systems. By carefully managing the electromagnetic emissions from the system components, such as the mmWave sensor, example implementations of the system reduce the likelihood of detection by electronic surveillance equipment. An example implementation of the system is designed to minimize noise generation from its components, such as cooling fans or mechanical parts, to avoid drawing attention to its presence. An example implementation of the system is designed with various concealment options, such as being disguised as a common object found in the environment, such as a wi-fi router device, an automatic door sensor, light poles, walls, plant pots, a bird house, or signs.

Example implementations of the disclosed system provides a low-power concealed weapons detection device and method which addresses the limitations of traditional concealed weapons detection devices and methods by emphasizing low-power consumption, mobility, covert design, AI-based object analysis, and integrated communication systems for threat warnings. The example implementations can enhance public safety by providing a more efficient and effective solution for detecting concealed weapons on individuals in various settings.

In an example implementation, the power management system of the device plays an important role in preserving battery life and reducing energy consumption. By activating the video camera only when an object of interest is detected by the mmWave sensor, the device conserves power and extends its operational lifespan.

In order to ensure accurate object detection and classification, in an example implementation, the device's AI engine 105 is trained on a diverse dataset of concealed weapons and non-threatening objects, and the AI engine 105 continuously updates and refines its classification algorithms, allowing it to adapt to new types of threats and improve its overall detection capabilities.

In an example implementation, the communication system, which is integrated into the device, enables efficient transmission of warning messages when a detected object is identified as a threat. Compatible with traditional internet, cellular internet, or low-power networks such as LoRaWAN, the communication system of the example implementation ensures timely alerts to relevant authorities or security personnel, allowing for a swift response to potential threats.

In example implementations, the low-power concealed weapons detection device and method described herein offer a novel approach to detecting concealed weapons on individuals. By leveraging advanced sensors, AI-driven object analysis, and integrated communication systems, some example implementations provide a more efficient, effective, and energy-conscious solution for enhancing public safety in various settings. In example implementations, the portable and covert design of the device further expands its potential applications, making it a valuable tool for law enforcement, security personnel, and public spaces in need of heightened security measures.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

The invention claimed is:

1. A method of detecting security incidents and generating alerts, comprising the steps of:
   (a) receiving an input from at least one mmWave sensor device, such input associated with potential security incidents, such input indicating a region of interest where an object of interest is present, such region of interest being associated with a vicinity in which the mmWave sensor device is located, wherein the mmWave sensor device detects a deviation from a baseline reading and indicates the region of interest in which the object of interest is present, in response to detection of such deviation;
   (b) processing the received input using an artificial intelligence (AI) engine and generating predicted labels describing the object of interest and the potential security incidents;
   (c) activating, in response to a content of a generated predicted label, at least one video camera or infrared sensor device, associated with the indicated region of interest, to provide an output from the at least one video camera or infrared sensor device;

(d) processing the output from the at least one video camera or infrared sensor device using the AI engine to generate predicted labels describing the object of interest and the potential security incidents; and (e) providing alerts to at least one of a plurality of output devices, where a value of a predicted label from either step (b) or step (d) indicates a detection of a particular object of interest or a particular security incident;

wherein an output from the AI engine is provided to a set-up and configuration management module which is configured to specify values of variables used to manage the providing of the alerts to the output devices; and wherein the set-up and configuration management module is configured to specify values of variables such that if an input from a video camera indicates a potential security incident, but no input from an mmWave sensor also indicates a potential security incident, then an alert is not provided to an output device.

2. The method of claim 1 further comprising providing the generated labels to an image overlay module, together with the received inputs from the at least one mmWave sensor device and the at least one video camera, where the image overlay module overlays data from the at least one mmWave sensor device onto an image from the at least one video camera for display on a user interface display device.

3. The method of claim 2 wherein the AI engine generates a confidence level associated with each predicted label, and the generated confidence level is displayed on the user interface display device.

4. The method of claim 2 wherein the image overlay module includes a data fusion module which includes an alignment mechanism which aligns data from the mmWave sensor device and the at least one video camera or infrared sensor device.

5. The method of claim 4, wherein the alignment mechanism uses depth information extraction techniques.

6. The method of claim 5, wherein the depth information extraction techniques use one or more background objects.

7. The method of claim 1, wherein the AI engine is trained in advance using a training dataset obtained from the at least one mmWave sensor and the at least one video camera.

8. The method of claim 1, wherein the output devices generate any one of alarm siren signals, flashing lights, vibration signals, digital alerts to notify the appropriate authorities.

9. The method of claim 1 wherein the predicted labels correspond to levels of security threat.

10. A method of detecting security incidents and generating alerts, comprising the steps of:
(a) receiving an input from at least one mmWave sensor device, such input associated with potential security incidents, such input indicating a region of interest where an object of interest is present, such region of interest being associated with a vicinity in which the mmWave sensor device is located, wherein the mmWave sensor device detects a deviation from a baseline reading and indicates the region of interest in which the object of interest is present, in response to detection of such deviation;

(b) processing the received input using an artificial intelligence (AI) engine and generating predicted labels describing the object of interest and the potential security incidents;

(c) activating, in response to a content of a generated predicted label, at least one video camera or infrared sensor device, associated with the indicated region of interest, to provide an output from the at least one video camera or infrared sensor device;

(d) processing the output from the at least one video camera or infrared sensor device using the AI engine to generate predicted labels describing the object of interest and the potential security incidents; and (e) providing alerts to at least one of a plurality of output devices, where a value of a predicted label from either step (b) or step (d) indicates a detection of a particular object of interest or a particular security incident;

wherein the particular security incident is a detection of a metallic object; and wherein the detection of the metallic object further includes a detection of a specific metal composition.

11. The method of claim 10 wherein the metallic object is a weapon.

12. A method of detecting security incidents and generating alerts, comprising the steps of:
(a) receiving an input from at least one mmWave sensor device, such input associated with potential security incidents, such input indicating a region of interest where an object of interest is present, such region of interest being associated with a vicinity in which the mmWave sensor device is located, wherein the mmWave sensor device detects a deviation from a baseline reading and indicates the region of interest in which the object of interest is present, in response to detection of such deviation;

(b) processing the received input using an artificial intelligence (AI) engine and generating predicted labels describing the object of interest and the potential security incidents;

(c) activating, in response to a content of a generated predicted label, at least one video camera or infrared sensor device, associated with the indicated region of interest, to provide an output from the at least one video camera or infrared sensor device;

(d) processing the output from the at least one video camera or infrared sensor device using the AI engine to generate predicted labels describing the object of interest and the potential security incidents; and (e) providing alerts to at least one of a plurality of output devices, where a value of a predicted label from either step (b) or step (d) indicates a detection of a particular object of interest or a particular security incident;

further comprising providing the generated labels to an image overlay module, together with the received inputs from the at least one mmWave sensor device and the at least one video camera, where the image overlay module overlays data from the at least one mmWave sensor device onto an image from the at least one video camera for display on a user interface display device;

wherein the image overlay module includes a data fusion module which uses a focusing mechanism to adjust a focus of the mmWave sensor device and the at least one video camera or infrared sensor device, on the region of interest.

13. The method of claim 12 wherein the focusing mechanism uses depth information to set a focus distance for the mmWave sensor and the video camera or infrared sensor device, with respect to the region of interest.

14. The method of claim 12 wherein the focusing mechanism operates in a feedback loop, constantly evaluating the captured images and adjusting a focus distance in real-time.

15. A computing system for detecting security incidents and generating alerts, comprising a processor and one or more memory devices communicatively coupled with the processor and storing instructions for, when executed on the processor, causing the computer system to carry out the steps of:

(a) receiving an input from at least one mmWave sensor device, such input associated with potential security incidents, such input indicating a region of interest where an object of interest is present, such region of interest being associated with a vicinity in which the mmWave sensor device is located, wherein the mmWave sensor device detects a deviation from a baseline reading and indicates the region of interest in which the object of interest is present, in response to detection of such deviation;

(b) processing the received input using an artificial intelligence (AI) engine and generating predicted labels describing the object of interest and the potential security incidents;

(c) activating, in response to a content of a generated predicted label, at least one video camera or infrared sensor device, associated with the indicated region of interest, to provide an output from the at least one video camera or infrared sensor device;

(d) processing the output from the at least one video camera or infrared sensor device using the AI engine to generate predicted labels describing the object of interest and the potential security incidents; and (e) providing alerts to at least one of a plurality of output devices, where a value of a predicted label from either step (b) or step (d) indicates a detection of a particular object of interest or a particular security incident;

wherein the particular security incident is a detection of a metallic object; and wherein the detection of the metallic object further includes a detection of a specific metal composition.

16. A non-transitory computer readable device having instructions stored thereon that when executed by at least one computing device, causing the at least one computing device to perform operations comprising:

(a) receiving an input from at least one mmWave sensor device, such input associated with potential security incidents, such input indicating a region of interest where an object of interest is present, such region of interest being associated with a vicinity in which the mmWave sensor device is located, wherein the mmWave sensor device detects a deviation from a baseline reading and indicates the region of interest in which the object of interest is present, in response to detection of such deviation;

(b) processing the received input using an artificial intelligence (AI) engine and generating predicted labels describing the object of interest and the potential security incidents;

(c) activating, in response to a content of a generated predicted label, at least one video camera or infrared sensor device, associated with the indicated region of interest, to provide an output from the at least one video camera or infrared sensor device;

(d) processing the output from the at least one video camera or infrared sensor device using the AI engine to generate predicted labels describing the object of interest and the potential security incidents; and (e) providing alerts to at least one of a plurality of output devices, where a value of a predicted label from either step (b) or step (d) indicates a detection of a particular object of interest or a particular security incident;

wherein the particular security incident is a detection of a metallic object; and wherein the detection of the metallic object further includes a detection of a specific metal composition.

* * * * *